United States Patent
Promper et al.

(10) Patent No.: US 7,083,159 B2
(45) Date of Patent: Aug. 1, 2006

(54) PRECISION FLOW-CONTROL DEVICE USING MULTIPLE SHUTTERS

(75) Inventors: Christophe Promper, Verviers (BE); Thomas Badinand, Liege (BE)

(73) Assignee: Techspace Aero S.A., Milmort (BE)

( * ) Notice: Subject to any disclaimer, the term of this patent is extended or adjusted under 35 U.S.C. 154(b) by 62 days.

(21) Appl. No.: 10/742,124

(22) Filed: Dec. 19, 2003

(65) Prior Publication Data
US 2004/0129911 A1   Jul. 8, 2004

(30) Foreign Application Priority Data
Dec. 20, 2002   (EP) .................................. 02447266

(51) Int. Cl.
*F16K 11/00*   (2006.01)
(52) U.S. Cl. ...................... 251/208; 251/248
(58) Field of Classification Search ................ 251/205, 251/208, 209, 248–250.5
See application file for complete search history.

(56) References Cited

U.S. PATENT DOCUMENTS 5,417,083 A      5/1995  Eber
6,491,063 B1 *  12/2002  Benatav ................. 137/625.43

FOREIGN PATENT DOCUMENTS

GB        883911       12/1961
JP        60070427      4/1985

* cited by examiner

*Primary Examiner*—J. Casimer Jacyna
(74) *Attorney, Agent, or Firm*—Knobbe Martens Olson & Bear LLP

(57) ABSTRACT

This invention relates to a shutter device for the precision control of a flow, comprising at least one organ for shutting a section for the passage of a flow, the motion of which is proportional to that of an actuator controlling it, wherein said device comprises at least two shutter organs controlled by the actuator by means of a transmission allowing to obtain slightly different proportionality coefficients for the motion of said organs.

21 Claims, 2 Drawing Sheets

PRECISION FLOW-CONTROL DEVICE USING MULTIPLE SHUTTERS

CROSS REFERENCE TO RELATED APPLICATIONS

This application claims priority under 35 U.S.C. § 119 to European Patent Application No. 02447266.4, filed on Dec. 20, 2002.

1. Field of the Invention

The present invention relates to a class of devices such as control valves, intended for the proportional control of flow.

The term "flow" relates both to a material fluid, as for instance in the case of a valve controlling a liquid or gaseous flow, and to an electromagnetic radiation, as for instance in the case of a shutter or diaphragm for visible light.

Examples of application areas are thus the area of precision control valves in aeronautics, optics or the multimedia (cinema, photography, etc.).

2. State of the Art

Proportional control valves having a motor or an actuator running a single shutter of the plug, butterfly or grid type, etc. are known.

The resulting absolute precision in the shutting directly arises from the combination of:

- the "precision" defined by the reproducibility of a motion, the resolution or the smallest achievable motion, the hysteresis or mechanical clearance in the system, etc. of the actuator or motor element of the device described and
- the precision relative to the characteristic of the shutter used: the linearity or evolution in the resistive feature, such as the drop in pressure for a valve, the percentage of shutting for a diaphragm, etc., of the shutter as a function of its shift, the reproducibility of this resistive feature, the mechanical clearance in the transmission, etc.

It thus can be noted that in the case of existing proportional valves, a requirement for very high shutting precision entails the need for very high precision in the production of the critical components of such valves, which proves to be expensive.

Aims of the Invention

The present invention aims to provide a solution allowing to avoid the drawbacks of the state of the art.

In particular, the invention aims to provide a very-high-precision flow-control device at a reasonable cost and in particular not requiring the production of very-high-precision parts.

Main Characteristic Elements of the Invention

The present invention relates to a shutter device for the precision control of a flow, comprising at least one organ for shutting one section for the passage of the flow, the motion of which is proportional to that of an actuator controlling it, wherein said device comprises at least two shutter organs controlled by the actuator by means of a transmission allowing to obtain slightly different proportionality coefficients for the motion of said organs.

According to a first preferred embodiment of the invention, said shutter organs both have a rotary motion controlled by a motor shaft that is actuated by hand, electrically or otherwise, by means of a transmission allowing to transmit to them the motion of said shaft with slightly different transmission ratios, preferably reduction ratios.

Advantageously, said rotary shutter organs are in the form of plugs, butterflies or grids that may move independently of each other.

Preferably, said transmission is a transmission by gear, by roller or by chain.

Advantageously, the device of the invention comprises a grid shutter where said shutter organs have a passage section or aperture in the form of a crown section with the same axis, internal and external radii, the aperture being limited to an angle $\alpha$ less than or equal to $2\pi$, preferably less than or equal to $\pi$.

According to another preferred embodiment of the invention, said shutter organs both have a linear motion and are preferably curtain shutters.

The motor shaft may be provided with two interdependent pinions, in the case of two rotary or linear shutters. The motor shaft may also be provided with a double rack, in the case of two rotary shutters activated by a linear motion.

Another aspect of the invention is the use of a shutter device such as described above in a high-precision control valve, for instance in the aeronautical and space sectors.

Yet another aspect of the invention is the use of a shutter device such as described above as a precision shutter for electromagnetic radiation, preferably for visible light, such as the diaphragm of a projector or of a radiation sensor.

SHORT DESCRIPTION OF THE FIGURES

Figure 2:
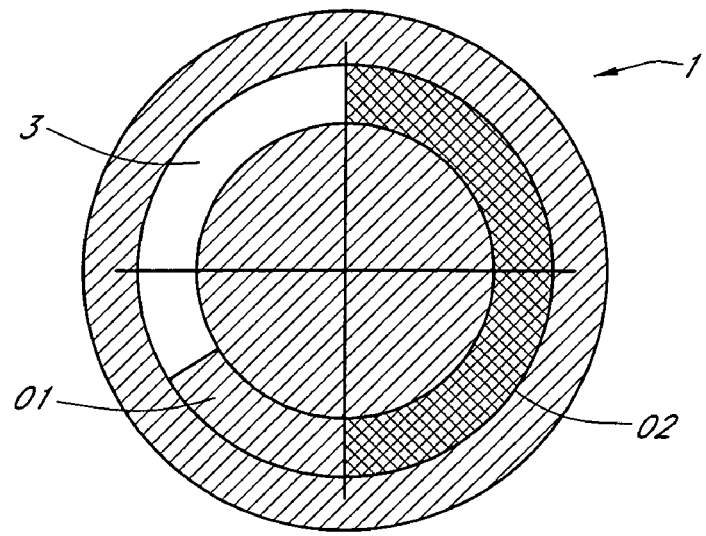
FIG. 2 shows a shutter with two organs, each one presenting a passage section in the form of a partial crown according to the present invention.
Figure 3:
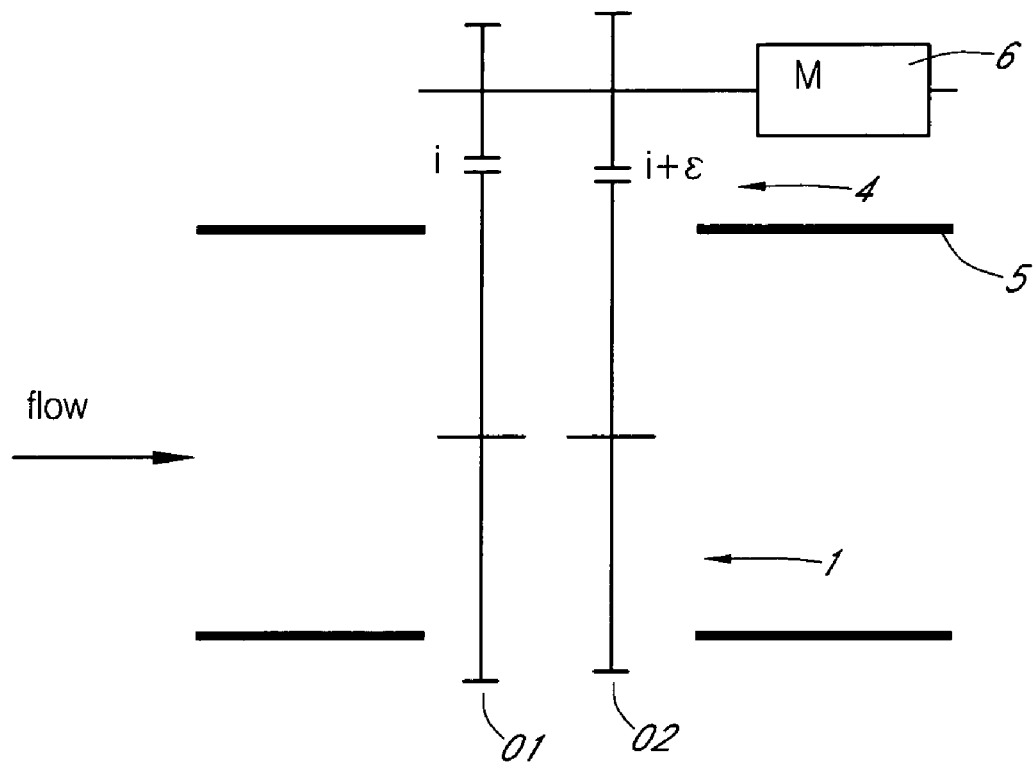

FIG. 3 diagrammatically shows the shutter with two organs of FIG. 2 where said organs are actuated by gear transmission.

DESCRIPTION OF A PREFERRED EMBODIMENT OF THE INVENTION

Figure 1:
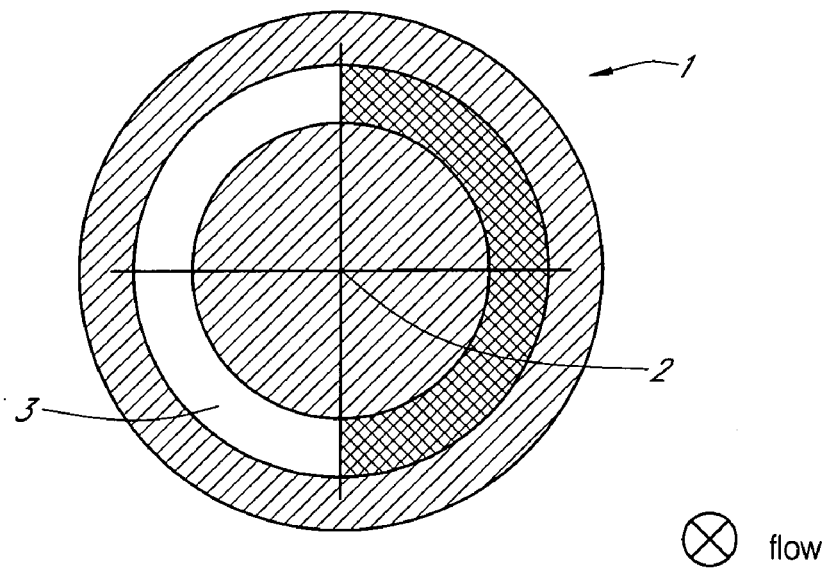
FIG. 1 shows an example of a simple shutter with a passage section in the form of a partial crown, with one or several perforations, according to the state of the art.

The present invention will be described hereinafter with reference to a specific case of the state of the art shown in FIG. 1 and consisting of a simple rotary shutter 1 with a passage section 3 that is a crown section of axis 2 and aperture $\alpha$ (e.g. $\alpha = \pi$).

The device proposed by the present invention comprises:
1. a mechanical actuator;
2. a shutter with two organs, O1 and O2, which move:
   proportionally to the motion of the actuator;
   with slightly different proportionality coefficients;
3. a mechanical transmission allowing the precise transmission of the actuator motion with slightly different reduction ratios.

The operating principles may be detailed by the following example which relates, as mentioned above, to rotary shutters with a passage section in the form of a partial crown with a given angle $\alpha$.

Being:

$\delta\theta_m$, an incremental shift of the rotary shutter, $i_1$, the transmission ratio between the actuator shaft and the shutter O1 (see FIG. 2), $i_2$, the transmission ratio between the actuator shaft and the shutter O2, $\epsilon = i_2 - i_1$ ($\epsilon \ll 1$), $\delta\theta_1 = i_1 \cdot \delta\theta_m$, the incremental shift of the shutter O1, resulting from an actuator motion $\delta\theta_m$, $\delta\theta_2=i_2.\delta\theta_m$, the incremental shift of the shutter O2, resulting from an actuator motion $\delta\theta_m$, S1, pass surface of shutter O1, S2, pass surface of shutter O2, the form of the shutters being for instance a crown section of aperture $\alpha$ (radians), internal radius $r_{int}$ and external radius $r_{ext}$ identical for both shutters, $$S1=S2=S=\alpha.(r_{ext}^2-r_{int}^2)/2(0<\alpha\leq 2\pi),$$

a valve comprising the above-described elements with the initial conditions:

$$\theta_m=\theta_1=\theta_2=.$$

Hence:

for an incremental shift $\delta\theta_m$ of the actuator shaft, the resulting motion of the shutters equals $$\delta\theta=i_2.\delta\theta_m-i_1.\delta\theta_m=\epsilon.\delta\theta_m;$$

the evolution in the effective passage section becomes:

$$\delta S=\delta\theta.(r_{ext}^2-r_{int}^2)/2=\epsilon.[\delta\theta_m.(r_{ext}^2-r_{int}^2)/2]=\epsilon.\delta\theta_m.S/\alpha;$$

This relationship shows that if $\epsilon$ is small, a relatively large motion by the motor shaft leads to a small evolution in the pass section S. For instance, if $\alpha=\pi$ and $\epsilon=0.01$, then a motion of the motor shaft of amplitude $\pi$ (half a turn) causes an evolution of 0.01. $\pi S/\pi$, i.e. equal to 1% of the pass section;

the shutter O1 completes a turn after i ($=i_1$) turns of the motor shaft;

the shutter O2 completes a turn after (i+$\epsilon$) turns of the motor shaft;

both shutters O1 and O2 will be back in their respective start position after a number of turns equal to $$i*(i+\epsilon),$$

i.e. of the order of $i^2$.

In concrete terms, the device in the present invention may take the form of various preferred embodiments depending for instance on whether the motion of the shutter is rotary or linear.

Rotary Motion

The differential motion may be achieved by classical, mechanical drive means such as for instance:

gears with slightly different transmission ratios; these gears may be of any type known to those skilled in the art such as, for example, cylindrical pinions with straight or helical teeth, a toothed crown and a worm screw, hypoid pinions, etc.;

roller transmission;

chain transmission.

FIG. 3 is a diagrammatic illustration of a rotary shutter in a valve 5 where the differential motion of the two elements O1, O2 forming it is achieved by means of a gear transmission 4 between the motor (actuator) 6 and the shutter 1.

Linear Motion

The same principle may be applied to linear (curtain) shutters.

The device according to the invention has the advantage of offering a very-high precision of the control system in an open loop without requiring great precision in the individual parts.

What is claimed is:

1. A shutter device for the precision flow-control comprising at least two shutter organs for shutting one section for the passage of the flow, the motion of each of said shutter organs being proportional to that of an actuator controlling it, wherein said shutter organs are controlled by the actuator by means of a transmission configured to obtain slightly different proportionality coefficients for the motion of said organs.

2. A device as in claim 1, wherein said shutter organs both have a rotary motion controlled by a motor shaft by means of a transmission configured to transmit to the shutter organs the motion of said shaft with slightly different transmission ratios.

3. A device as in claim 2, wherein the transmission ratios are reduction ratios.

4. A device as in claim 2, wherein said rotary shutter organs are in the form of plugs, butterflies or grids configured to move independently of each other.

5. A device as in claim 2, wherein said transmission comprises gears, rollers or chain.

6. A device as in claim 2, further comprising a grid shutter wherein said shutter organs have an aperture in the form of a crown section with the same axis, internal and external radii, the aperture being limited to an angle less than or equal to $2\pi$.

7. A device as in claim 5, wherein the aperture is limited to an angle of less than or equal to $\pi$.

8. A device as in claim 1, wherein said shutter organs both have a linear motion.

9. A device as in claim 8, wherein said shutter organs are curtain shutters.

10. A method of precisely controlling fluid flow in a high-precision control valve, the method comprising:

providing a shutter device comprising organs for shutting a section thereof, wherein said device comprises at least two shutter organs proportionally controlled by a single actuator;

providing a transmission between the actuator and the organs, the transmission providing a slightly different proportionality coefficient for each of the organs;

placing the shutter device in a fluid flow path;

actuating the organs in to allow a controlled quantity of fluid to pass through the shutter device.

11. The method of claim 10, wherein the controlled quantity of fluid is proportional to a difference between said proportionality coefficients.

12. The method of claim 10, wherein the proportionality coefficients comprise transmission ratios of gear sets between the actuator and the organs.

13. The method of claim 10, wherein the first and second organs rotate about a common axis.

14. The method of claim 10, wherein said shutter device is present in a vehicle selected from the group consisting of an aeronautical vehicle and a space vehicle.

15. A method of precisely controlling transmission of electromagnetic radiation, the method comprising:

providing a shutter device comprising organs for shutting a section thereof, wherein said device comprises at least two shutter organs proportionally controlled by a single actuator;

providing a transmission between the actuator and the organs, the transmission providing a different proportionality coefficient for each of the organs;

placing said shutter device in a flow path of electromagnetic radiation;

actuating the organs to allow a controlled quantity of radiation to travel through the shutter device.

16. The method of claim 15, wherein the electromagnetic radiation is visible light.

17. The method of claim 15, wherein the controlled quantity of radiation is proportional to a difference between said proportionality coefficients.

18. The method of claim 15, wherein the proportionality coefficients comprise transmission ratios of gear sets between the actuator and the organs.

19. The method of claim 15, wherein the first and second organs rotate about a common axis.

20. The method of claim 15, wherein said electromagnetic radiation is visible light.

21. The method of claim 20, wherein said shutter device is present in a device selected from the group consisting of a projector and a radiation detector.

* * * * *

UNITED STATES PATENT AND TRADEMARK OFFICE
CERTIFICATE OF CORRECTION

| | | |
|---|---|---|
| PATENT NO. | : 7,083,159 B2 | Page 1 of 1 |
| APPLICATION NO. | : 10/742124 | |
| DATED | : August 1, 2006 | |
| INVENTOR(S) | : Promper et al. | |

It is certified that error appears in the above-identified patent and that said Letters Patent is hereby corrected as shown below:

Column 3, line 12, delete "$\theta_m=\theta_1=\theta_2=.$" And insert -- $\theta_m=\theta_1=\theta_2=0.$ --, therefor.

Column 3, line 20, delete "$\varepsilon.[\delta\theta_m.(r_{ext}2-r_{int}2)/2]$" and insert -- $\varepsilon.[\delta\theta_m.(r_{ext}^2-r_{int}^2)/2]$ --, therefor.

Signed and Sealed this

Tenth Day of April, 2007

JON W. DUDAS
*Director of the United States Patent and Trademark Office*